United States Patent
Tanner et al.

(10) Patent No.: US 9,551,373 B2
(45) Date of Patent: Jan. 24, 2017

(54) APPARATUS FOR FUEL TANK SPARK CONTAINMENT

(71) Applicant: The Boeing Company, Chicago, IL (US)

(72) Inventors: Richard B. Tanner, Seattle, WA (US); James Frederick Ackermann, Woodinville, WA (US)

(73) Assignee: THE BOEING COMPANY, Chicago, IL (US)

( * ) Notice: Subject to any disclaimer, the term of this patent is extended or adjusted under 35 U.S.C. 154(b) by 162 days.

(21) Appl. No.: 14/317,434

(22) Filed: Jun. 27, 2014

(65) Prior Publication Data
US 2015/0377279 A1 Dec. 31, 2015

(51) Int. Cl.
| | |
|---|---|
| *F16B 35/02* | (2006.01) |
| *F16B 43/00* | (2006.01) |
| *F16B 5/02* | (2006.01) |
| *B64D 45/02* | (2006.01) |
| *B64D 37/00* | (2006.01) |
| *F16B 4/00* | (2006.01) |
| *F16B 33/00* | (2006.01) |

(52) U.S. Cl.
CPC ........... *F16B 43/001* (2013.01); *B64D 37/005* (2013.01); *B64D 45/02* (2013.01); *F16B 5/0258* (2013.01); *F16B 4/004* (2013.01); *F16B 5/02* (2013.01); *F16B 33/008* (2013.01)

(58) Field of Classification Search
CPC ........... F16B 4/004; F16B 5/02; F16B 5/0258; F16B 33/004; F16B 33/008; F16B 43/00; F16B 43/001; F16B 2043/008; F16B 35/02; B63D 37/005; B63D 45/02

USPC ............... 411/80.5–80.6, 339, 383, 531, 542
See application file for complete search history.

(56) References Cited

U.S. PATENT DOCUMENTS

| | | | | | |
|---|---|---|---|---|---|
| 3,212,393 | A | * | 10/1965 | Waeltz | F16B 39/24 411/371.2 |
| 3,298,725 | A | * | 1/1967 | Boteler | B61F 5/26 403/282 |
| 3,485,132 | A | * | 12/1969 | Hanny | F16B 15/0092 29/458 |
| 3,639,137 | A | * | 2/1972 | Marinelli | F16B 15/0092 411/548 |
| 3,835,525 | A | * | 9/1974 | King, Jr. | B23P 9/025 29/412 |

(Continued)

FOREIGN PATENT DOCUMENTS

| | | |
|---|---|---|
| EP | 2453142 A1 | 5/2012 |
| EP | 2733367 A1 | 5/2014 |

OTHER PUBLICATIONS

Extended European Search Report, dated Nov. 2, 2015, regarding Application No. EP15170259.4, 8 pages.

*Primary Examiner* — Roberta Delisle
(74) *Attorney, Agent, or Firm* — Yee & Associates, P.C.

(57) ABSTRACT

A method and apparatus for forming a seal over a hole in a structure. The apparatus comprises a washer, a sleeve, and a fastener. The washer has a first channel. The sleeve has a second channel and an expandable section. The sleeve is positioned inside the first channel in the washer. The fastener has an elongate portion positioned inside the second channel of the sleeve to cause at least a portion of the expandable section of the sleeve to form a first interference fit with the washer.

13 Claims, 11 Drawing Sheets

(56) References Cited

U.S. PATENT DOCUMENTS

| | | | | |
|---|---|---|---|---|
| 3,835,615 | A * | 9/1974 | King, Jr. ................ | B23P 9/025 |
| | | | | 248/909 |
| 4,048,898 | A * | 9/1977 | Salter ..................... | F16B 5/02 |
| | | | | 29/446 |
| 4,521,147 | A | 6/1985 | King, Jr. et al. | |
| 4,793,752 | A | 12/1988 | Frieberg | |
| 4,883,395 | A * | 11/1989 | Klaric ..................... | A47F 5/14 |
| | | | | 411/55 |
| 5,188,495 | A * | 2/1993 | Jones, Jr. ............... | F16B 43/001 |
| | | | | 285/220 |
| 5,281,065 | A * | 1/1994 | Wu ......................... | F16J 15/064 |
| | | | | 411/258 |
| 5,332,348 | A * | 7/1994 | Lemelson ............... | B23D 61/185 |
| | | | | 411/157 |
| 5,407,313 | A * | 4/1995 | Bruins .................... | E04D 5/143 |
| | | | | 411/369 |
| 6,692,083 | B2 * | 2/2004 | Latham ................... | E21C 35/18 |
| | | | | 299/104 |
| 6,857,835 | B2 * | 2/2005 | Wang ...................... | B60B 27/00 |
| | | | | 301/35.55 |
| 2008/0310932 | A1 * | 12/2008 | McIntyre ................ | B29C 70/80 |
| | | | | 411/150 |
| 2013/0089389 | A1 | 4/2013 | Gong et al. | |
| 2014/0072385 | A1 | 3/2014 | Pham | |
| 2016/0040709 | A1 * | 2/2016 | Achtner .................. | F16B 43/00 |
| | | | | 411/337 |

\* cited by examiner

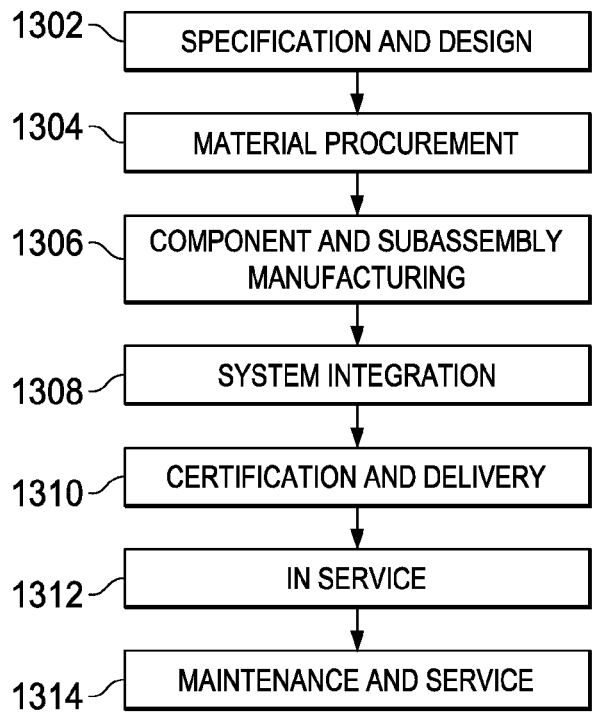
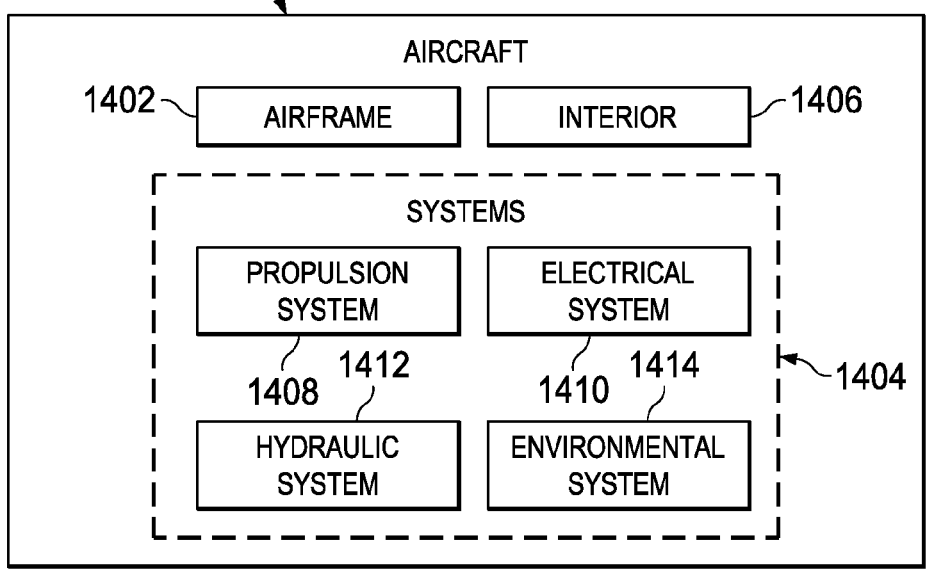

APPARATUS FOR FUEL TANK SPARK CONTAINMENT

BACKGROUND INFORMATION

1. Field

The present disclosure relates generally to aircraft and, in particular, to manufacturing aircraft. Still more particularly, the present disclosure relates to a method and apparatus for spark containment at a fastener installed in a structure for an aircraft.

2. Background

In manufacturing aircraft, different parts may be connected to each other to form aircraft structures. A number of fasteners are used to assemble these structures, join these structures, or both. Thousands of fasteners are used in a single aircraft.

Oftentimes, fasteners are installed to meet various industry requirements. For instance, to minimize corrosion, fasteners may be installed such that fluids do not pass into the interior of the aircraft structure. Fasteners also may have spark protection to prevent sparking within the interior of the aircraft structure.

Spark protection is particularly important in flammable areas of the aircraft. In some instances, spark protection may be achieved using a sleeved fastener having an interference fit with the aircraft structure. This interference fit between the sleeve and the aircraft structure electrically connects the fastener system to the structure, thus providing spark protection for the fastener.

While this interference fit provides a first level of protection from sparking, aircraft regulatory agencies require a fault tolerant design in flammable areas of the aircraft. In other words, the design must take into account possible manufacturing faults. Examples of manufacturing faults include oversized holes, contamination, angled holes, burrs, or other manufacturing inconsistencies.

The presence of one of these faults may generate a spark in the hole. This sparking may produce particles that lead to undesired conditions in the aircraft. As a result, a method of spark containment, or a second level of spark protection, is required to meet agency standards.

In some cases, a cap seal is applied over the head of the sleeved fastener to achieve fault tolerance. This cap seal must be precisely and consistently applied to ensure coverage over the entire head of the fastener, as well as any inconsistent portions of the hole.

The application of cap seals to each fastener may slow the installation process more than desired. Moreover, applying cap seals to thousands of fasteners consistently may be more difficult than desired. Therefore, it would be desirable to have a method and apparatus that take into account at least some of the issues discussed above, as well as other possible issues.

SUMMARY

Embodiments of the disclosure provide a fault tolerance design for spark protection and containment at a fastener in a flammable zone in an aircraft structure, without the need for a cap seal over the head of the fastener. The illustrative embodiments may be used in fuel tanks and other flammable areas of the aircraft to mechanically seal the fastener hole.

In an illustrative embodiment, a fastener system having a sleeve, a fastener, and a washer is positioned over a hole drilled through parts used to form an aircraft structure. The sleeve fits over the fastener and the washer fits over the sleeve. When installed, the washer is located between the flange of the sleeve and the aircraft structure.

To install the fastener system, the elongate portion of the fastener is driven into the sleeve. When no faults are present, an interference fit is formed between the sleeved fastener and the aircraft structure to electrically bond the two components to prevent sparking.

Fault tolerance is achieved with the washer seated on the flange of the sleeve. As the elongate portion of the fastener is driven into the sleeve, the sleeve expands to form an interference fit with the washer. This interference fit, along with fastener clamp up, provides a level of redundancy for the mechanical seal.

A fastener system in accordance with an illustrative embodiment is operable even when manufacturing faults degrade the electrical connection of the fastener system to the structure such that sparking occurs inside the hole. The washer, interference fit with the sleeve, seals the hole even when an interference fit cannot be formed between the sleeve and the hole.

Since gaps between the washer and the sleeve are eliminated, hot plasma particles induced by sparking are contained inside the hole. Cap seals are unnecessary because the washer creates a barrier such that the hot plasma particles cannot escape the hole. Eliminating the need for installing a cap seal over the fastener head speeds up the installation process, while providing a fault tolerant design in flammable zones of the aircraft. The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 13 is an illustration of an aircraft manufacturing and service method in the form of a block diagram in accordance with an illustrative embodiment; and FIG. 14 is an illustration of an aircraft in the form of a block diagram in which an illustrative embodiment may be implemented.

DETAILED DESCRIPTION

The illustrative embodiments recognize and take into account one or more different considerations. For example, the illustrative embodiments recognize and take into account that it is desirable to provide a fault tolerant design for spark containment in certain areas of an aircraft. The illustrative embodiments recognize and take into that an interference fit between a fastener and a structure forms a first level of spark protection by providing a conductive path.

The illustrative embodiments further recognize and take into account that cap seals may be used to provide a second level of spark protection. The illustrative embodiments recognize and take into account, however, that the application of cap seals to the fasteners adds additional steps to the installation process. The illustrative embodiments recognize and take into account that when thousands of fasteners are installed in an aircraft, these additional steps add countless hours to the production time for the aircraft. Moreover, extensive inspection of each fastener adds substantial cost.

The illustrative embodiments further recognize and take into account that fasteners installed in certain areas of the aircraft must provide a seal to substantially prevent particles from entering and escaping the hole. For example, the illustrative embodiments recognize and take into account that it may be desirable to prevent fuel, gas particles, or some combination thereof from escaping the hole, entering the hole, or both.

Thus, the illustrative embodiments provide a method and apparatus for forming a seal over a hole in a structure. In particular, the illustrative embodiments provide a fastening system for use on a structure. The system comprises a bolt, a washer, and a sleeve having a body and a flange. The fastening system is configured such that when the sleeve is disposed about the bolt and the washer is disposed about the sleeve, a seal is formed between the washer and the body of the sleeve to mitigate particle ejection between the washer and the sleeve.

Figure 1:
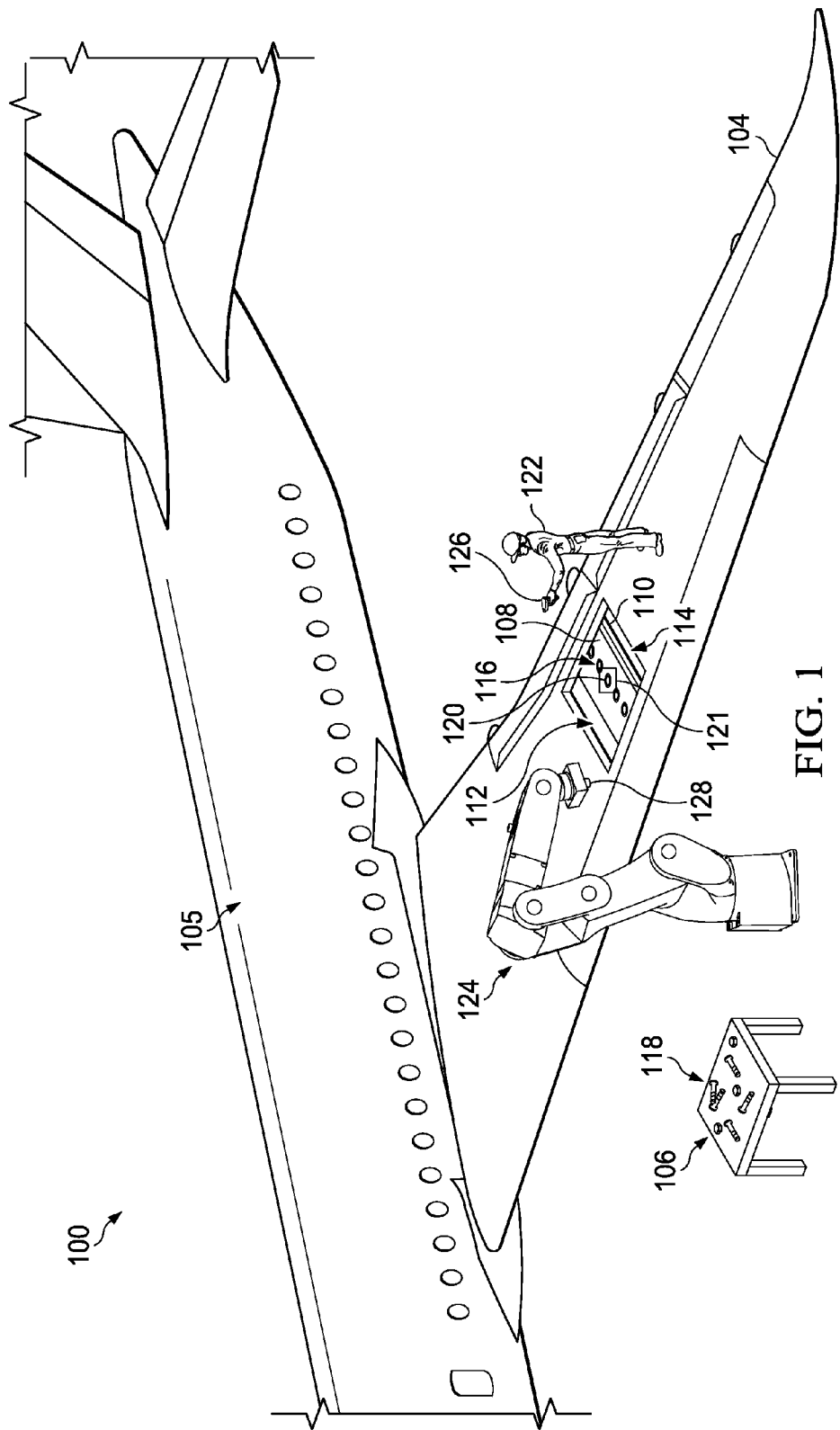
FIG. 1 is an illustration of a manufacturing environment in accordance with an illustrative embodiment.

Referring now to the figures and, in particular, with reference to FIG. 1, an illustration of a manufacturing environment is depicted in accordance with an illustrative embodiment. In this depicted example, manufacturing environment 100 is an example of one environment in which wing 104 for aircraft 105 is formed. Components within wing 104 of aircraft 105 are joined using fastener systems 106.

As depicted, fastener systems 106 are mechanical assemblies used to join first part 108 with second part 110 to form a structure. In this illustrative example, first part 108 and second part 110 are used to assemble fuel tank 112 within wing 104 of aircraft 105. At least one of first part 108 or second part 110 comprises a composite material.

As used herein, the phrase "at least one of," when used with a list of items, may mean different combinations of one or more of the listed items may be used and only one of each item in the list may be needed. The item may be a particular object, thing, or category. In other words, "at least one of" may mean any combination of items and number of items may be used from the list, but not all of the items in the list may be required.

For example, without limitation, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The presence of fuel tank 112 in wing 104 forms flammable zone 114 in wing 104. Additional safety precautions are taken in flammable zone 114 when joining first part 108 and second part 110 such that fuel or other particles do not escape through holes 116.

As illustrated, fastener systems 106 are positioned in holes 116. Fastener systems 106 include components that electrically bond and seal holes 116 in addition to joining first part 108 and second part 110.

In this illustrative example, fastener system 118 is one of fastener systems 106. Fastener system 118 comprises various components used to join first part 108 and second part 110.

Fastener system 118 corresponds with hole 120. In this depicted example, hole 120 is drilled through first part 108 and second part 110. Hole 120 is shown in section 121 in this illustrative example.

In some cases, hole 120 may be drilled in an undesired manner in either first part 108 or second part 110. In one illustrative example, hole 120 may be larger than desired. In this case, hole 120 is an oversized hole.

Hole 120 also may include other inconsistencies. For instance, hole 120 may have contaminants, burrs, or voids, among other inconsistencies. These inconsistencies affect the fit and electrical bond between fastener system 118 and hole 120.

As depicted, human operator 122, robotic operator 124, or both may position fastener systems 106 in holes 116 in wing 104 to assemble fuel tank 112. For example, human operator 122 may use handheld tool 126 to apply a force to the components within fastener system 118 to form a desired interference fit between components. This force also may form a desired interference fit between fastener system 118 and hole 120 drilled in first part 108 and second part 110. In a similar fashion, robotic operator 124 may use end effector 128 to apply a force to the components to form the desired interference fit.

In this illustrative example, an interference fit is an engagement between two or more components which is achieved by friction after the two components are pushed together. An interference fit is often used when an opening in one component is larger than the diameter of a second component.

Figure 2:
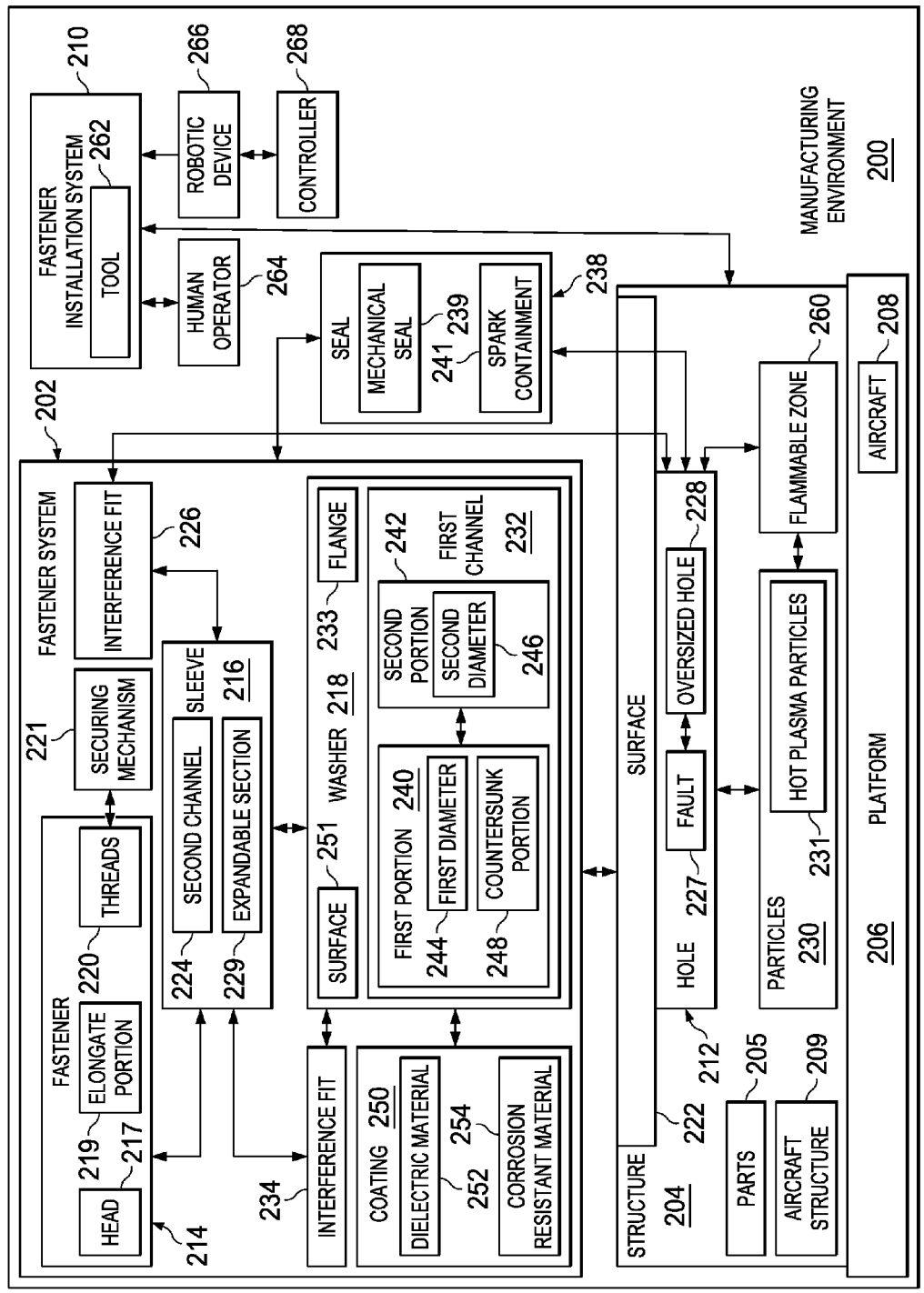
FIG. 2 is an illustration of a block diagram of a manufacturing environment in accordance with an illustrative embodiment.

Turning next to FIG. 2, an illustration of a block diagram of a manufacturing environment is depicted in accordance with an illustrative embodiment. Manufacturing environment 200 may be an example of one environment in which fastener system 202 may be installed in structure 204. Manufacturing environment 100 shown in FIG. 1 is an example of a physical implementation for manufacturing environment 200 shown in block form in this figure.

In the illustrative example, structure 204 may take a number of different forms. For example, without limitation, structure 204 may be selected from one of a compartment, a bin, a pressurized container, a fuel tank, a wing box, a wing, a skin panel, a structural frame, an engine housing, and other suitable types of structures. Structure 204 may be formed by joining parts 205.

As depicted, structure 204 is physically associated with platform 206. For example, without limitation, a first component, structure 204, is considered to be physically associated with a second component, platform 206, by being secured to the second component, bonded to the second component, mounted to the second component, welded to the second component, fastened to the second component, and/or connected to the second component in some other suitable manner. The first component also may be connected to the second component using a third component. The first component may also be considered to be physically associated with the second component by being formed as part of the second component, an extension of the second component, or both.

Platform 206 takes the form of aircraft 208 in the illustrative example. Aircraft 105 in FIG. 1 is an example of a physical implementation of aircraft 208 in this figure. When platform 206 takes the form of aircraft 208, structure 204 is aircraft structure 209.

As illustrated, fastener installation system 210 may be used to install fastener system 202 in structure 204. Fastener system 202 may join parts 205 to form structure 204. Fastener system 202 is installed in hole 212 in structure 204 in this illustrative example.

Fastener system 202 may include a number of components. As used herein, a "number of" items may include one or more items. In this manner, a number of components is one or more components.

As depicted, fastener system 202 includes fastener 214, washer 218 having first channel 232, sleeve 216 having second channel 224, and securing mechanism 221. Fastener system 202 also may include additional washers, spacers, nuts, and other components, depending on the particular implementation. In this depicted example, fastener 214 may be selected from one of a sleeved hexdrive bolt, a sleeved lockbolt, a tapered sleeved bolt, and other suitable types of fasteners.

In an illustrative example, fastener 214 has head 217, elongate portion 219, and threads 220. Head 217 is larger than elongate portion 219. Head 217 is shaped to prevent fastener 214 from being driven deeper into structure 204 than desired. Elongate portion 219 is the cylindrical portion of fastener 214 that extends from the end of head 217. Threads 220 are helical structures used to engage securing mechanism 221 to clamp up structure 204 as needed.

Fastener 214 protrudes from structure 204 when installed in hole 212 in this illustrative example. In other words, head 217 of fastener 214 extends outward from surface 222 of structure 204. In this manner, fastener 214 may be referred to as a protruding fastener.

In this illustrative example, sleeve 216 is a mechanical device configured to receive fastener 214. Sleeve 216 has second channel 224 and expandable section 229. Second channel 224 is an opening in sleeve 216.

In this depicted example, sleeve 216 receives fastener 214 in second channel 224. The shape of sleeve 216 may substantially correspond to the shape of fastener 214 in this illustrative example. Expandable section 229 comprises deformable material that expands when elongate portion 219 is moved into sleeve 216.

As depicted, fastener 214 and sleeve 216 have interference fit 226 with a wall of hole 212 in structure 204 when elongate portion 219 of fastener 214 is located inside second channel 224 of sleeve 216. In this illustrative example, an "interference fit" may be formed when an opening receives a structure having a diameter that is greater than the opening. For instance, an interference fit fastener, such as fastener 214, has a elongate portion with a diameter that is greater than the diameter of the cylindrical portion of the hole in which it is installed.

When installing a sleeved fastener with an interference fit, the combined diameter of the fastener with the sleeve is greater than the cylindrical portion of the hole in which it is installed. In this illustrative example, elongate portion 219 of fastener 214 with sleeve 216 may have a combined diameter that is greater than a diameter of the cylindrical portion of hole 212 extending through structure 204. Interference fit 226 is configured to eliminate gaps and provide an electrical bond between sleeve 216 and structure 204 inside hole 212 to prevent sparking inside hole 212. In some cases, hole 212 may have fault 227. Fault 227 may be a departure from design specifications such as, for example, an oversized hole, an angled hole, a burr, a contaminated hole, a void within the hole, or some other fault.

In this illustrative example, hole 212 may take the form of oversized hole 228. Oversized hole 228 is a hole that has been drilled outside of selected tolerances. For example, oversized hole 228 may have a diameter that is greater than desired to form interference fit 226. In another example, oversized hole 228 may have an irregular shape. When hole 212 is oversized, interference fit 226 is not properly formed, resulting in a gap being present between structure 204 and sleeve 216 inside hole 212. As a result, particles 230 may pass through hole 212 between sleeve 216 and structure 204.

It is undesirable for particles 230 to pass through hole 212 in this illustrative example. For example, particles 230 may be hot, flammable, or some combination thereof. In addition, particles 230 may cause a thermal reaction that melts a portion of structure 204.

In this illustrative example, particles 230 may take various forms. For example, without limitation, particles 230 may comprise a metallic or non-metallic material. In some cases, particles 230 may be hot plasma particles 231. Hot plasma particles 231 may form when sparking inside oversized hole 228 ionizes particles 230. Hot plasma particles 231 may be ejected from oversized hole 228 if a seal is not established.

To prevent particles 230 from escaping structure 204 through oversized hole 228, washer 218 is positioned between flange 233 of sleeve 216 and surface 222 of structure 204. Washer 218 has an outer diameter that is larger than a hole diameter of hole 212 in structure 204. Washer 218 has first channel 232 in this illustrative example.

First channel 232 of washer 218 is configured to receive sleeve 216. Sleeve 216, with elongate portion 219 inside sleeve 216, has interference fit 234 with washer 218 when sleeve 216 and elongate portion 219 are located inside first channel 232 of washer 218.

Washer 218 forms seal 238 over hole 212 when sleeve 216 with fastener 214 located inside second channel 224 of sleeve 216 is installed within hole 212. In particular, washer 218 forms seal 238 that substantially prevents particles 230 from passing between washer 218 and sleeve 216. Further, washer 218 having interference fit 234 with sleeve 216 provides spark containment 241 to substantially prevent particles 230 from escaping through hole 212. In this manner, washer 218 seals hole 212 in structure 204.

Securing mechanism 221 enhances seal 238 by providing clamp up. For example, securing mechanism 221 may be connected to elongate portion 219 of fastener 214 such that securing mechanism 221 holds washer 218 against surface 222 of structure 204 such that washer 218 forms seal 238 around hole 212 when sleeve 216 is installed in hole 212. Securing mechanism 221 may take the form of a nut, a collar, or some other suitable securing mechanism.

Seal 238 may be an airtight seal in this illustrative example. In other words, in addition to preventing the ingress and egress of particles 230 through hole 212, seal 238 may substantially prevent air from passing through hole 212 as well.

Washer 218 forms seal 238 even if interference fit 226 between sleeve 216 and structure 204 is not formed as desired. In this manner, interference fit 234 between sleeve 216 and washer 218 provides a fault tolerant design to ensure particles 230 do not escape hole 212. The size and shape of washer 218 may be configured to form seal 238, even when hole 212 is oversized hole 228. Seal 238 takes the form of mechanical seal 239 in this illustrative example.

In this depicted example, first channel 232 in washer 218 is formed with first portion 240 and second portion 242. First portion 240 has first diameter 244, while second portion 242 has second diameter 246. Second diameter 246 is less than first diameter 244.

First channel 232 has first portion 240 and second portion 242 to ensure a desired level of containment for particles 230. In this illustrative example, second diameter 246 is less than the combined diameter of elongate portion 219 and the corresponding portion of sleeve 216. In this manner, interference fit 234 may be formed between second portion 242 of first channel 232 and sleeve 216.

First portion 240 may be countersunk portion 248 of washer 218 in this illustrative example. Countersunk portion 248 may comprise a conical hole drilled into washer 218. The shape of countersunk portion 248 may be selected to prevent inconsistencies from forming in sleeve 216, relieve pressure on sleeve 216, or both. Interference fit does not happen in the countersunk portion 248, only second portion 242. In this depicted example, countersunk portion 248 faces flange 233 of sleeve 216 when sleeve 216 is positioned inside first channel 232

Washer 218 also has coating 250 in this illustrative example. Coating 250 comprises a layer of material covering surface 251 of washer 218. Surface 251 may refer to the entire exterior surface of washer 218. In this illustrative example, coating 250 may include at least one of dielectric material 252, corrosion resistant material 254, a conductive material, or another suitable type of material.

Dielectric material 252 is an electrical insulator in this illustrative example. Dielectric material 252 may be used to prevent electric charges from flowing through dielectric material 252. In this manner, dielectric material 252 is configured to reduce current flow between sleeve 216 and washer 218. Dielectric material 252 may comprise a material selected from at least one of a polymer, a thermoplastic material, a thermoset material, an adhesive, rubber, or some other suitable type of material.

As depicted, corrosion resistant material 254 is configured to substantially prevent corrosion of washer 218. Specifically, corrosion resistant material 254 prevents corrosion of washer 218 such that seal 238 formed from interference fit 234 remains intact. Examples of corrosion resistant material 254 include corrosion-resistant steel, titanium, and other metals.

As illustrated, hole 212 may be located in flammable zone 260 in structure 204. Flammable zone 260 may be an area of structure 204 that has an increased risk of catching fire. Flammable zone 260 may be identified based on the type of structure 204, the flammability of particles 230 contained by structure 204, the location of structure 204 in platform 206, or a combination thereof. For instance, a fuel tank is a type of flammable zone 260.

The presence of oversized hole 228 in flammable zone 260 increases the risk of undesired conditions occurring in that area. Fastener system 202 with washer 218 mechanically seals oversized hole 228 in flammable zone 260 of structure 204 to prevent particles 230 from escaping through oversized hole 228. In this manner, fastener system 202 provides fault tolerant spark containment in flammable zone 260.

In this depicted example, fastener installation system 210 installs fastener system 202 in structure 204. Fastener installation system 210 may include tool 262.

Tool 262 is a device configured to install fastener 214 in sleeve 216 and sleeve 216 in washer 218 at substantially the same time. In this illustrative example, tool 262 exerts a force on these components to form interference fit 234 between washer 218 and sleeve 216. The force also may form interference fit 226 between sleeve 216 and hole 212 when hole 212 is not oversized.

Tool 262 may take various forms in this illustrative example. For example, without limitation, tool 262 may take the form of a hammer, a press, a riveting device, some other suitable type of tool, or a combination thereof.

In this depicted example, tool 262 may be configured to be operated by human operator 264, robotic device 266, or both. For example, without limitation, human operator 264 may place fastener 214 in sleeve 216. Human operator 264 then places sleeve 216 and washer 218 relative to hole 212 and hold tool 262 to install fastener system 202 in structure 204.

In another illustrative example, tool 262 is operated by robotic device 266. Robotic device 266 is a device that is configured to perform operations under the control of controller 268. Controller 268 may be hardware in this illustrative example, but may include firmware or software in other illustrative examples. For instance, controller 268 may be a processor unit or a computer system. Robotic device 266 may be controlled by controller 268 and also may receive input from human operator 264. Robotic device 266 may take the form of, for example, without limitation, a robotic arm.

With the use of fastener system 202, particles 230 are prevented from escaping through hole 212 in structure 204, even when hole 212 is formed outside selected tolerances. The formation of interference fit 234 between washer 218 and sleeve 216 alleviates the need for a cap seal to be formed over the head of the fastener after installation is complete. In the illustrative example, spark containment is achieved in a single installation step, rather than using a time-consuming cap seal installation process. Fault tolerance is provided with interference fit 226, interference fit 234, and clamp up from securing mechanism 221. Even if interference fit 226 is not formed as desired, the placement of washer 218 between surface 222 of structure 204 and sleeve 216 forms seal 238 for hole 212. The entire process may be automated to further speed up installation of fastener system 202 in the illustrative examples.

The illustration of fastener system 202 in FIG. 2 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For instance, in some examples, washer 218 may be comprised of a corrosion resistant steel material coated with dielectric material 252. In this instance, corrosion resistant material 254 in coating 250 may be omitted.

Further, although the illustrative examples are described with respect to aircraft 208, an illustrative embodiment may be applied to other types of platforms. In other illustrative examples, platform 206 may be, for example, without limitation, a mobile platform, a stationary platform, a land-based structure, an aquatic-based structure, and a space-based structure. More specifically, platform 206 may be a surface ship, a tank, a personnel carrier, a train, a spacecraft, a space station, a satellite, a submarine, an automobile, a power plant, a bridge, a dam, a house, a manufacturing facility, a building, and other suitable platforms.

Figure 3:
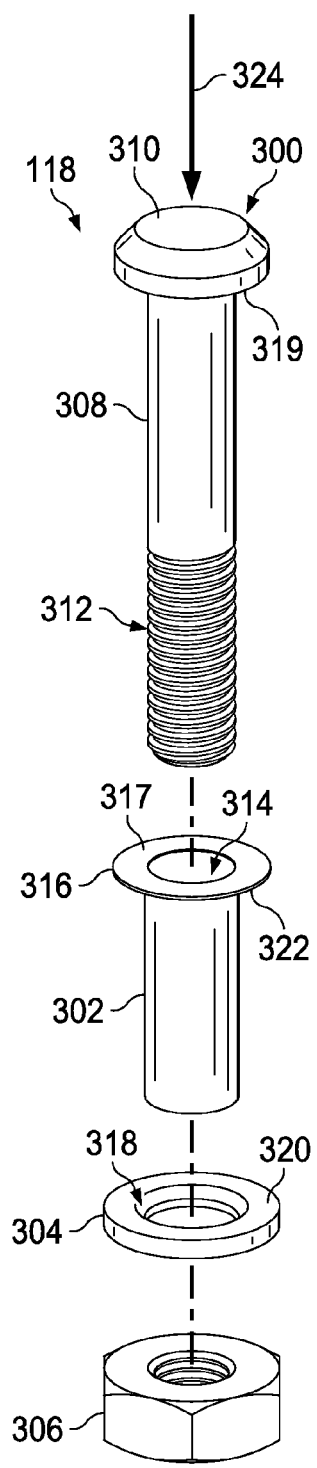
FIG. 3 is an illustration of an exploded view of a fastener system in accordance with an illustrative embodiment.
Figure 4:
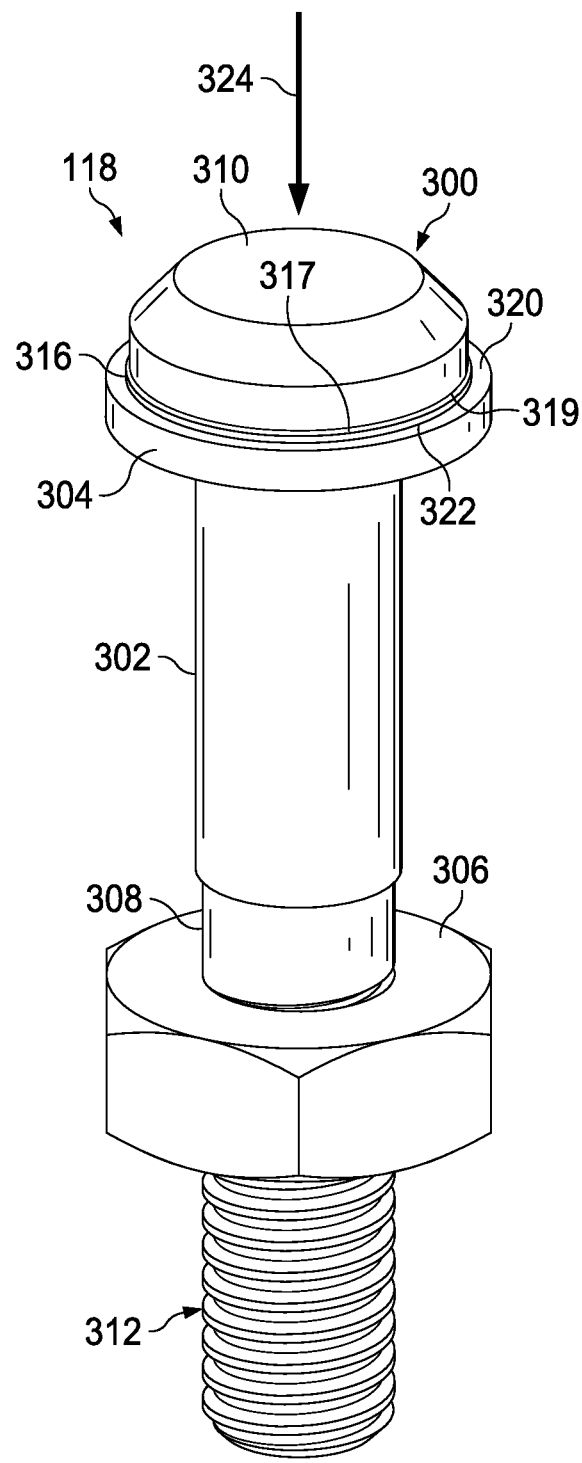
FIG. 4 is an illustration of a fastener system in accordance with an illustrative embodiment.
Figure 5:
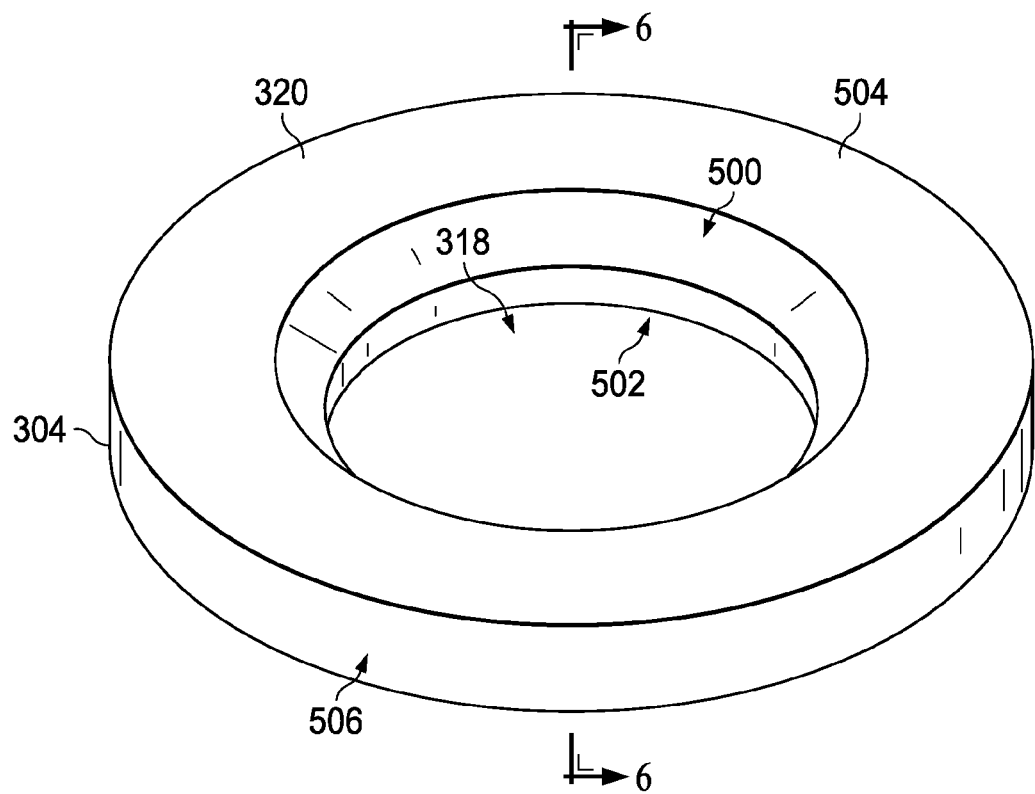
FIG. 5 is an illustration of a washer in accordance with an illustrative embodiment.

FIGS. 3-5 show the assembly of a fastener system in accordance with an illustrative embodiment. In FIGS. 3-5, fastener system 118 is assembled without being installed in hole 120 in FIG. 1 to show the interaction between components within fastener system 118 in greater detail.

With reference now to FIG. 3, an illustration of an exploded view of a fastener system is depicted in accordance with an illustrative embodiment. In this depicted example, an exploded view of fastener system 118 from FIG. 1 is shown.

As depicted, fastener system 118 includes fastener 300, sleeve 302, washer 304, and nut 306. Fastener 300 has elongate portion 308, head 310, and threads 312.

As illustrated, sleeve 302 has channel 314 and flange 316. Channel 314 receives elongate portion 308 of fastener 300. The diameter of channel 314 in sleeve 302 may be less than the diameter of elongate portion 308 such that an interference fit is formed between the two components.

When fastener 300 and sleeve 302 are fit together, flange 316 rests against head 310 of fastener 300 when fastener 300 is located inside channel 314 of sleeve 302. Surface 317 of flange 316 in sleeve 302 touches surface 319 of head 310 in fastener 300.

Washer 304 has channel 318 in this illustrative example. Channel 318 receives sleeve 302 and fastener 300. Channel 318 has a diameter which is less than the combined diameter of elongate portion 308 of fastener 300 and sleeve 302. This difference in diameter forms an interference fit between washer 304 and sleeve 302 when sleeve 302 is inside channel 318. In this depicted example, surface 320 of washer 304 rests against surface 322 of flange 316 of sleeve 302 when sleeve 302 is located inside channel 318 of washer 304.

A force is applied in the direction of arrow 324 to join fastener 300, sleeve 302, and washer 304 together. This force has a level that is sufficient to install fastener system 118 in hole 120 shown in FIG. 1. After these components are joined, and fastener system 118 is installed, nut 306 is threaded onto threads 312 to tighten down fastener 300.

With reference now to FIG. 4, an illustration of a fastener system is depicted in accordance with an illustrative embodiment. In this illustrative example, washer 304 and nut 306 have been added to fastener 300. Specifically, fastener 300 and sleeve 302 have moved in the direction of arrow 324 such that an interference fit is formed between washer 304 and sleeve 302. As depicted, nut 306 has been threaded onto fastener 300.

In FIG. 5, an illustration of a washer is depicted in accordance with an illustrative embodiment. In this depicted example, an enlarged view of washer 304 from FIG. 3 is shown.

As illustrated, channel 318 in washer 304 has a diameter that varies. In particular, channel 318 in washer 304 has first portion 500 and second portion 502. First portion 500 and second portion 502 have different diameters in this illustrative example.

Washer 304 is comprised of corrosion resistant material 504. Additionally, washer 304 is covered by coating 506. Coating 506 comprises a dielectric material in this illustrative example. This dielectric material in coating 506 prevents current flow between sleeve 302 and washer 304 when sleeve 302 is inside channel 318 of washer 304 as seen in FIGS. 3-4.

Figure 6:
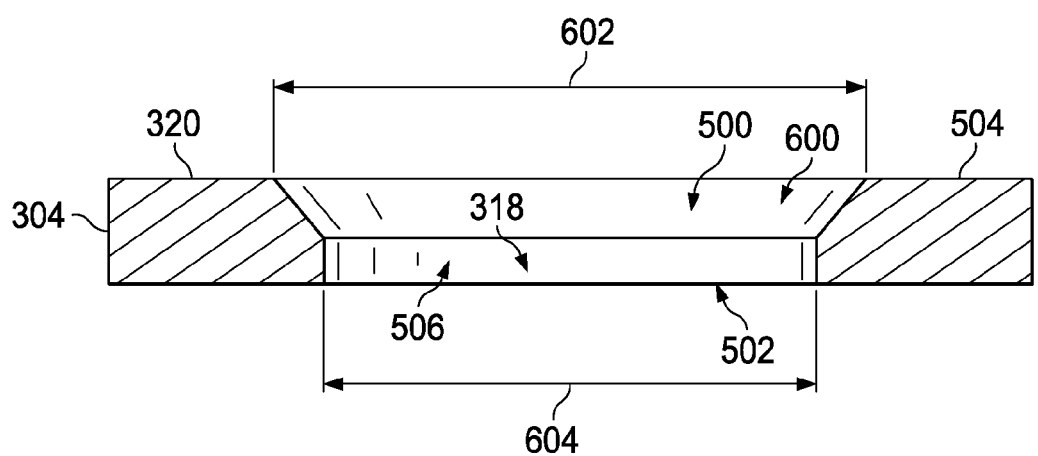
FIG. 6 is an illustration of a cross-sectional view of a washer in accordance with an illustrative embodiment.

Turning next to FIG. 6, an illustration of a cross-sectional view of a washer is depicted in accordance with an illustrative embodiment. In this illustrative example, a cross-sectional view of washer 304 taken in the direction of lines 6-6 in FIG. 5 is shown.

The different diameters of channel 318 in washer 304 are seen in this view. Countersink 600 has been formed in first portion 500 of channel 318. Countersink 600 is a conical hole corresponding to first portion 500 of channel 318. Countersink 600 has diameter 602 that tapers to diameter 604. When countersink 600 is formed in washer 304, first portion 500 is a countersunk portion of washer 304.

In this illustrative example, diameter 602 is greater than the combined diameter of sleeve 302 with elongate portion 308 of fastener 300 shown in FIGS. 3-4. Diameter 602 reduces the risk of inconsistencies forming in sleeve 302 and fastener 300 during installation.

Diameter 604 is smaller than the combined diameter of sleeve 302 with elongate portion 308. As a result, a desired interference fit is formed between components.

In other illustrative examples, first portion 500 of channel 318 may have other shapes other than countersink 600. In addition, first portion 500 may be drilled further into washer 304 than shown in this view. However, the presence of second portion 502 with diameter 604 is required to ensure that a desired interference fit is formed between sleeve 302 and washer 304.

Figure 7:
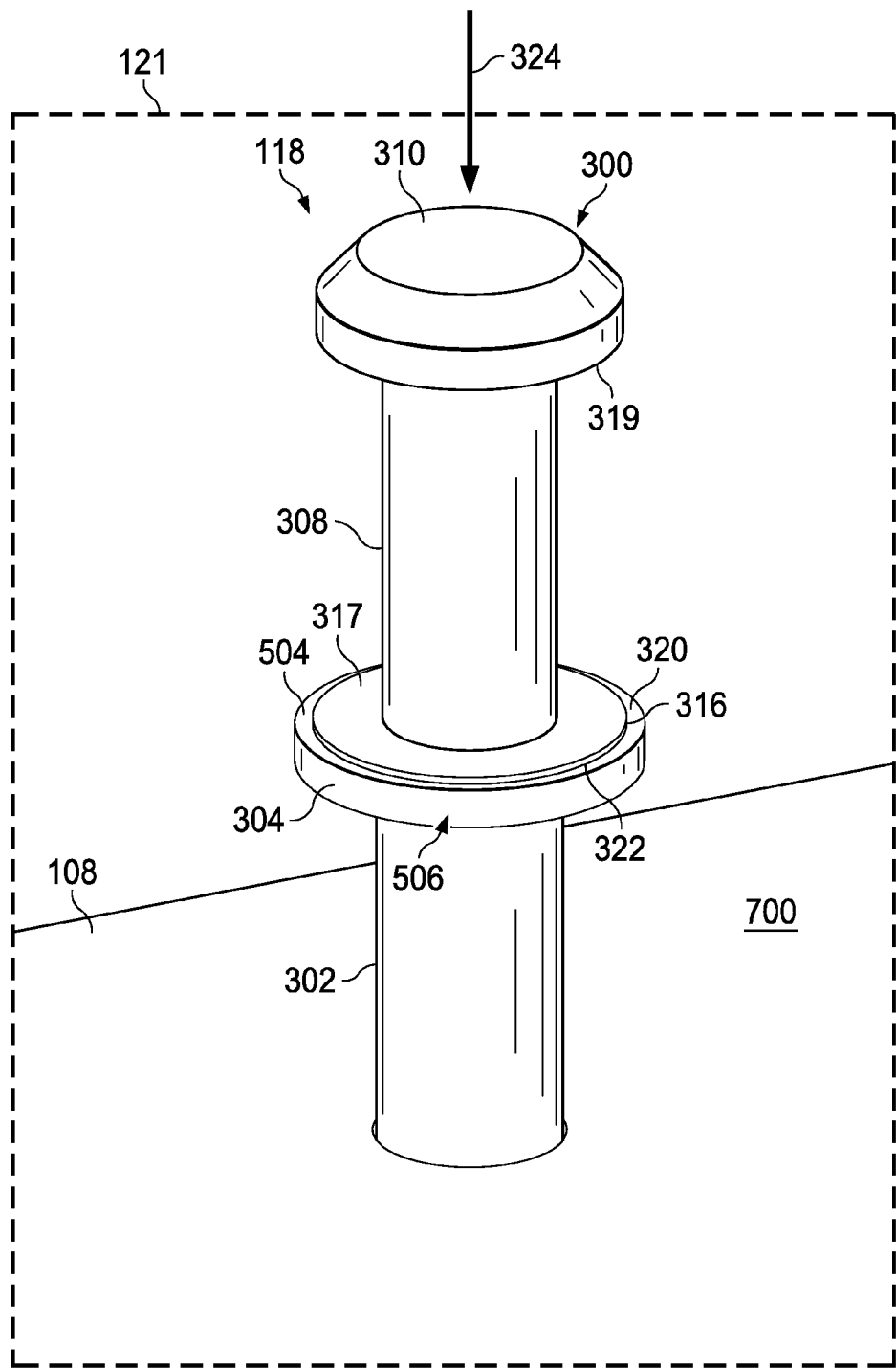
FIGS. 7-8 are illustrations of a fastener system being installed in a hole in accordance with an illustrative embodiment.
Figure 8:
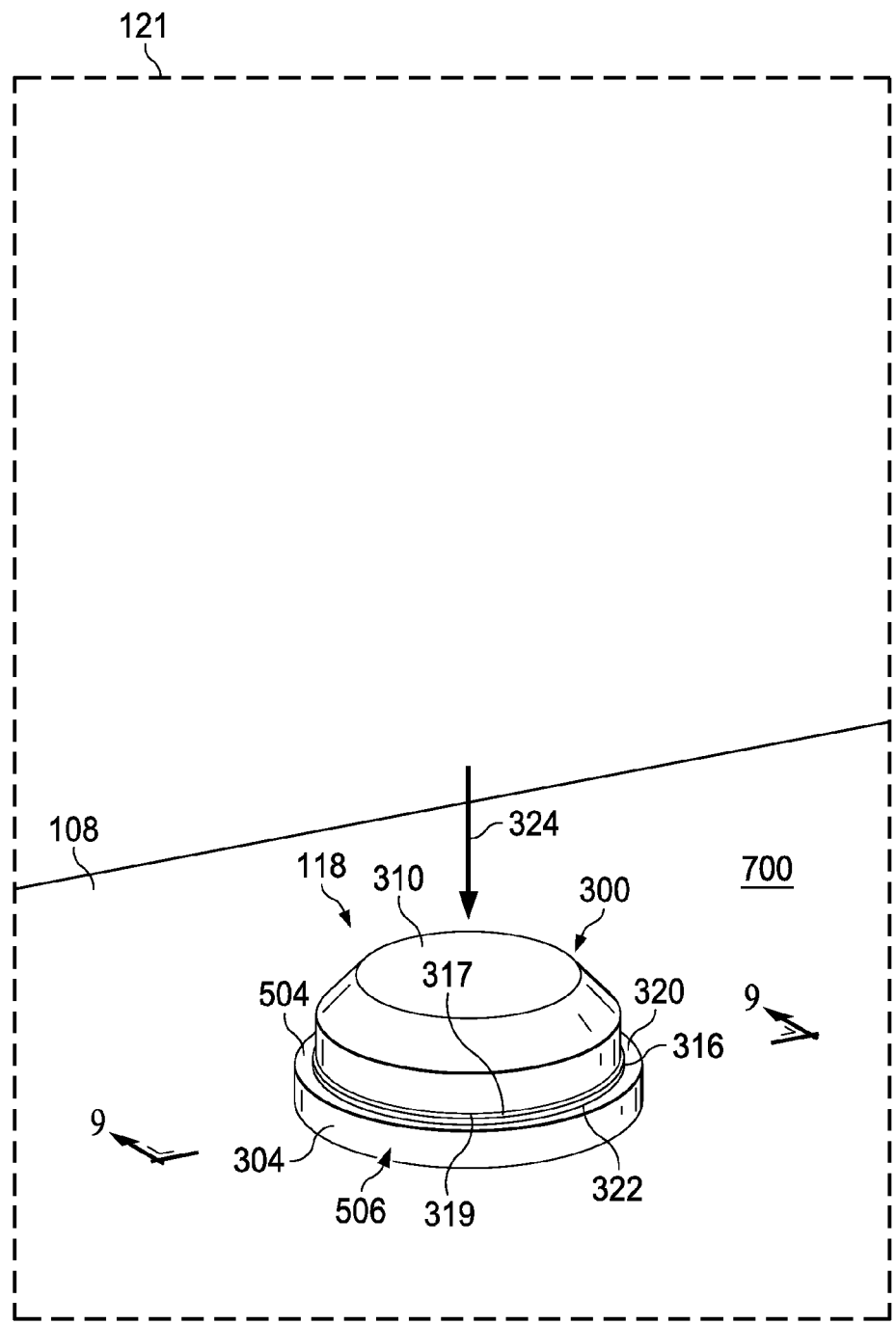
Figure 9:
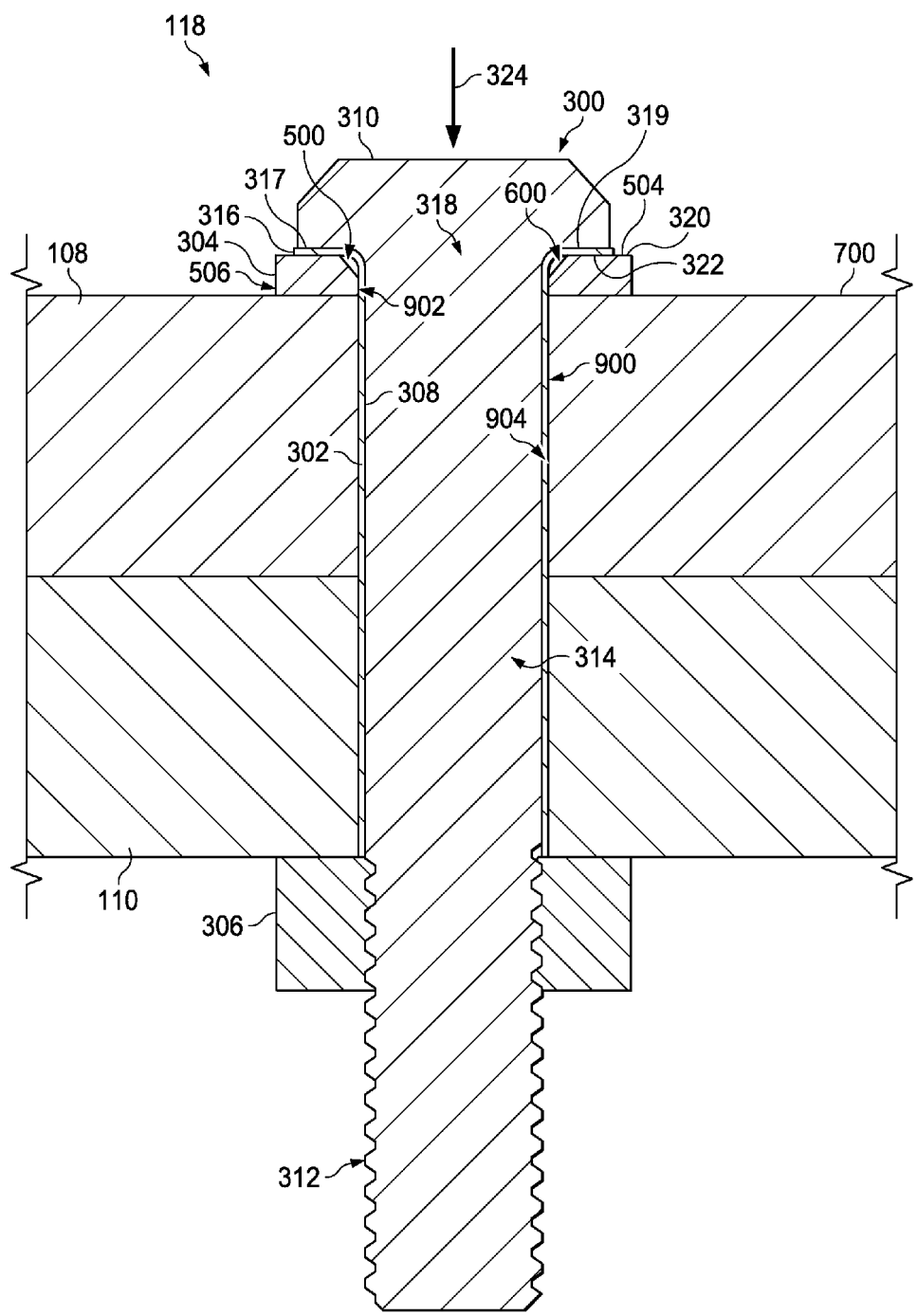
FIG. 9 is a cross-sectional view of a fastener system installed in a hole in accordance with an illustrative embodiment.

FIGS. 7-9 show a fastener system being installed in a hole in accordance with an illustrative embodiment. In FIGS. 7-9, section 121 from FIG. 1 is shown.

As shown in FIG. 7, the components in fastener system 118 are positioned on surface 700 of first part 108. In this illustrative example, washer 304 is positioned relative to hole 120 (obscured in this view) with surface 320 facing outward. Sleeve 302 is positioned within channel 318 of washer 304. Sleeve 302 is seated on flange 316. Threads 312 (not shown in this view) have been placed in channel 314 of sleeve 302.

The components within fastener system 118 are installed in hole 120 in a single processing step by applying a desired level of force in the direction of arrow 324. The desired level of force is selected such that fastener 300 is fit within sleeve 302 and sleeve 302 is interference fit with washer 304.

FIG. 8 shows fastener system 118 installed in hole 120. In this view, washer 304 is positioned between flange 316 of sleeve 302 and surface 700 of first part 108.

Turning to FIG. 9, a cross-sectional view of fastener system 118 installed in hole 120 is shown in the direction of lines 9-9 in FIG. 8. Nut 306 has been threaded onto threads 312 of fastener 300 to clamp first part 108 and second part 110 together.

Seal 900 has been formed to prevent particles from escaping through hole 120. In this illustrative example, seal 900 achieves a fault tolerant design for spark containment. First interference fit 902 is created between sleeve 302 and washer 304. Second interference fit 904 is created between sleeve 302 with fastener 300 and first part 108.

First interference fit 902 and second interference fit 904 reduce or eliminate gaps between components to prevent sparking. Even if sparking does occur, the mechanical seal created by washer 304 prevents particles from escaping hole 120. The need for cap seals is eliminated.

Figure 10:
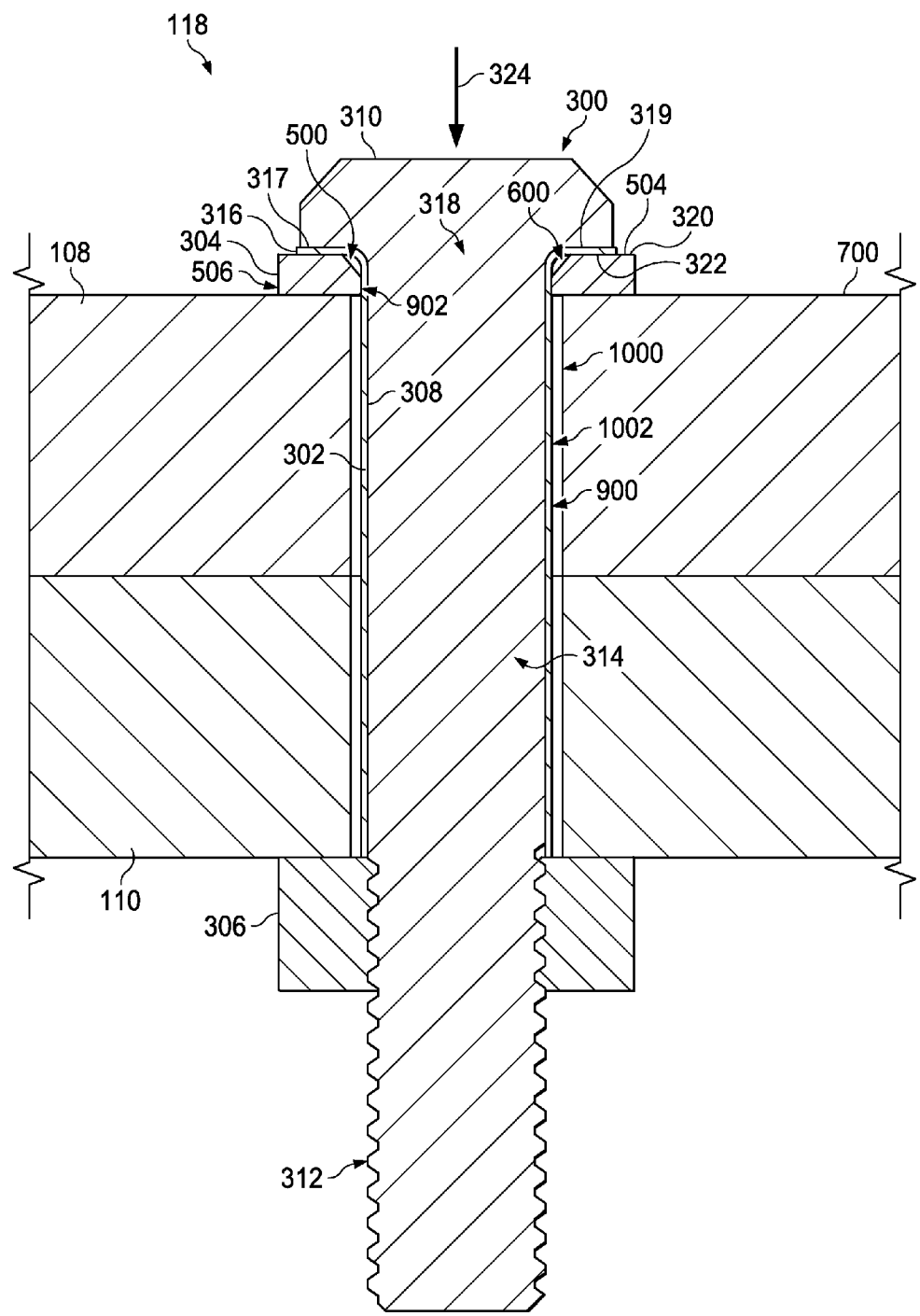
FIG. 10 is another cross-sectional view of a fastener system installed in a hole in accordance with an illustrative embodiment.

With reference next to FIG. 10, another cross-sectional view of fastener system 118 installed in hole 120 is shown in the direction of lines 9-9 in FIG. 8. In this depicted example, hole 120 takes the form of oversized hole 1000. Oversized hole 1000 has a diameter that is larger than the combined diameter of sleeve 302 and fastener 300 such that gap 1002 is present around the circumference of sleeve 302.

Gap 1002 increases the risk of sparking between components in fastener system 118. When sparking occurs, materials within first part 108, second part 110, or both may be vaporized.

In this illustrative example, washer 304, having first interference fit 902 with sleeve 302, ensures that seal 900 remains intact, even when gap 1002 is present. Without washer 304, the hot plasma particles might escape through oversized hole 1000.

The illustrations of fastener system 118 in FIG. 1 and FIGS. 3-10 are not meant to imply physical or architectural limitations to the manner in which an illustrative embodiment may be implemented. Other components in addition to or in place of the ones illustrated may be used. Some components may be optional.

The different components shown in FIG. 1 and FIGS. 3-10 may be illustrative examples of how components shown in block form in FIG. 2 can be implemented as physical structures. Additionally, some of the components in FIG. 1 and FIGS. 3-10 may be combined with components in FIG. 2, used with components in FIG. 2, or a combination of the two.

Figure 11:
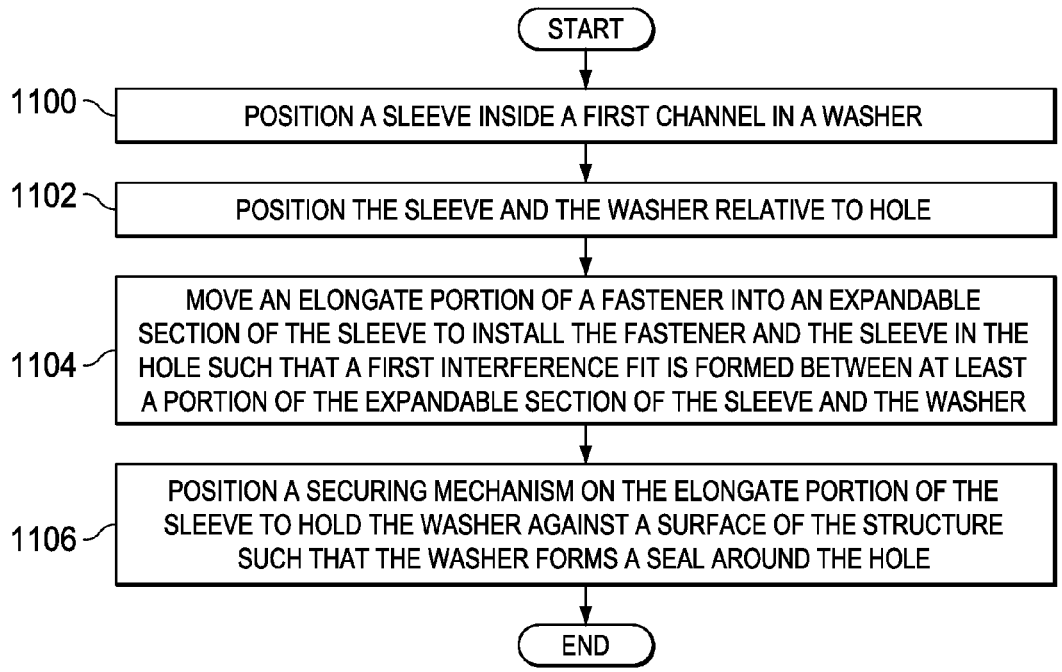
FIG. 11 is an illustration of a flowchart of a process for forming a seal over a fastener in a hole in a structure in accordance with an illustrative embodiment.

With reference now to FIG. 11, an illustration of a flowchart of a process for forming a seal over a hole in a structure is depicted in accordance with an illustrative embodiment. The process illustrated in FIG. 11 may be implemented in manufacturing environment 200 in FIG. 2. In particular, the process may be used to install fastener system 202 in structure 204 and form seal 238 in FIG. 2.

The process begins by positioning a sleeve inside a first channel in a washer (operation 1100). Thereafter, the process positions the sleeve and the washer relative to a hole (operation 1102).

The process then moves an elongate portion of a fastener into an expandable section of the sleeve to install the fastener and the sleeve in the hole such that a first interference fit is formed between at least a portion of the expandable section of the sleeve and the washer (operation 1104). In operation 1104, moving the elongate portion of the fastener into the sleeve causes at least a portion of the expandable section of the sleeve to expand to form the interference fit with the washer. In this manner, the washer provides a level of redundancy to seal the hole.

Next, the process positions a securing mechanism on the elongate portion of the sleeve to hold the washer against a surface of the structure such that the washer forms a seal around the hole (operation 1106), with the process terminating thereafter. In operation 1106, a nut may be threaded on the fastener.

Alternatively, the process may include swaging a collar onto the fastener.

Figure 12:
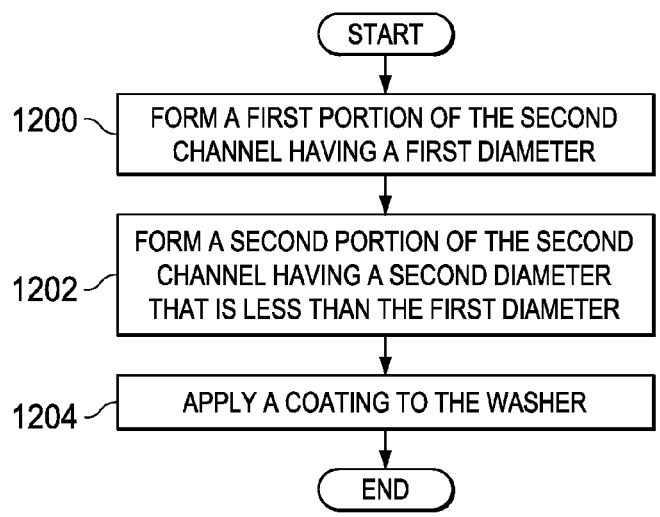
FIG. 12 is an illustration of a flowchart of a process for forming a washer in accordance with an illustrative embodiment.

Turning next to FIG. 12, an illustration of a flowchart of a process for forming a washer is depicted in accordance with an illustrative embodiment. The process illustrated in FIG. 12 may be implemented to form washer 218 with first channel 232 shown in FIG. 2.

The process begins by forming a first portion of the second channel having a first diameter (operation 1200). For example, in operation 1200, a countersink may be formed in the washer.

Next, the process forms a second portion of the second channel having a second diameter that is less than the first diameter (operation 1202). The process then applies a coating to the washer (operation 1204) with the process terminating thereafter. The coating may comprise a dielectric material, a corrosion resistant material, or both. The coating is applied prior to positioning the sleeve inside the first channel in the washer, as shown in operation 1100 in FIG. 11.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of a combination thereof of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in the form of a block diagram in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, an operator, or a combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in the form of a block diagram in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13. In particular, fastener system 202 from FIG. 2 may be installed in aircraft 1400 during at least one of component and subassembly manufacturing 1306, system integration 1308, routine maintenance and service 1314, or some other stage of aircraft manufacturing and service method 1300. For instance, fastener system 202 may be used to join parts to form an aircraft structure for aircraft 1400 during component and subassembly manufacturing 1306. In another example, fastener system 202 installed during routine maintenance and service 1314 to rework an oversized hole.

In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13. As yet another example, one or more apparatus embodiments, method embodiments, or a combination thereof may be utilized during production stages, such as component and subassembly manufacturing 1306 and system integration 1308 in FIG. 13. One or more apparatus embodiments, method embodiments, or a combination thereof may be utilized while aircraft 1400 is in service 1312, during maintenance and service 1314 in FIG. 13, or a combination thereof. The use of a number of the different illustrative embodiments may substantially expedite the assembly, reduce the cost of aircraft 1400, or both.

Thus, the illustrative embodiments provide a method and apparatus for installing fastener 214 in hole 212 in aircraft structure 209 to form seal 238. Fastener system 202 comprises fastener 214 having head 217 and elongate portion 219, sleeve 216 having second channel 224, and washer 218 having first channel 232. Fastener 214 and sleeve 216 may have interference fit 226 with hole 212 when elongate portion 219 of fastener 214 is located in second channel 224 of sleeve 216. In some cases, however, fault 227, such as oversized hole 228, eliminates interference fit 226. Sleeve 216 and washer 218 have interference fit 234 when sleeve 216 is located in first channel 232 of washer 218. Interference fit 234 forms seal 238 to prevent the ingress and egress of particles 230 through hole 212, even when interference fit 226 is not formed as desired.

With the use of an illustrative embodiment, fastener systems can be installed in a single step, without the need for a cap seal. In this manner, assembly time is reduced and cost savings are realized.

The formation of an interference fit between a washer and a sleeved fastener provides a fault tolerant design for spark containment in flammable zones of an aircraft without additional processing steps. Even if the hole is an oversized hole, the interference fit of the washer and sleeved fastener prevents ingress and egress of particles through the hole, providing redundant spark containment in accordance with applicable guidelines. By eliminating the need for a cap seal, consistency between fastener installations may be increased compared to existing techniques.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a washer having a first channel;
   a sleeve having a second channel and an expandable section, wherein the sleeve is positioned inside the first channel in the washer;
   a fastener having an elongate portion positioned inside the second channel of the sleeve to cause at least a portion of the expandable section of the sleeve to form a first interference fit with the washer, wherein the sleeve comprises a flange that rests against a head of the fastener, and wherein the washer rests against the flange of the sleeve; and
   a securing mechanism connected to the elongate portion of the fastener.

2. The apparatus of claim 1, wherein the washer has an outer diameter that is larger than a hole diameter of a hole in a structure.

3. The apparatus of claim 2, wherein the washer forms a seal over the hole such that when the sleeve with the fastener located inside the second channel of the sleeve is installed within the hole.

4. The apparatus of claim 3, wherein the seal substantially prevents particles from escaping the structure through the hole.

5. The apparatus of claim 4, wherein the particles comprise at least one of fuel particles, gas particles, or sparks.

6. The apparatus of claim 3 further comprising:
   the structure having the hole.

7. The apparatus of claim 6 further comprising:
   wherein the securing mechanism holds the washer against a surface of the structure such that the washer forms the seal around the hole when the sleeve is installed in the hole.

8. The apparatus of claim 1, wherein the sleeve is installed in a hole such that a second interference fit is formed between the sleeve and a wall of the hole.

9. The apparatus of claim 1 further comprising:
   a coating on a surface of the washer, wherein the coating comprises at least one of a dielectric material that reduces current flow between the sleeve and the washer or a corrosion resistant material that substantially prevents corrosion of the washer.

10. The apparatus of claim 9, wherein the dielectric material comprises a material selected from at least one of a polymer, a thermoplastic material, a thermoset material, an adhesive, or a rubber.

11. The apparatus of claim 1, wherein the washer has a first portion with a first diameter and a second portion with a second diameter that is less than the first diameter.

12. The apparatus of claim 1, wherein the washer comprises a countersunk portion.

13. An apparatus comprising:
- a washer comprising a countersunk portion, a first channel, and an outer diameter that is larger than a hole diameter of a hole in a structure;
- a sleeve having a second channel and an expandable section, wherein the sleeve is positioned inside the first channel in the washer;
- a fastener having an elongate portion positioned inside the second channel of the sleeve to cause at least a first portion of the expandable section of the sleeve to form a first interference fit with the washer and a second portion of the expandable section of the sleeve to form a second interference fit with a wall of the hole, wherein the sleeve comprises a flange that rests against a head of the fastener;
- a securing mechanism connected to the elongate portion of the fastener, wherein the securing mechanism holds the washer against a surface of the structure such that the washer forms the seal around the hole that substantially prevents particles from escaping the structure through the hole when the sleeve is installed in the hole; and
- a coating on a surface of the washer, wherein the coating comprises a dielectric polymer that reduces current flow between the sleeve and the washer.

\* \* \* \* \*